United States Patent [19]
Wakabayashi et al.

[11] Patent Number: 4,717,743
[45] Date of Patent: Jan. 5, 1988

[54] POLYOLEFIN-BASE RESIN COMPOSITION

[75] Inventors: Hiroyuki Wakabayashi; Fumio Kato, both of Kariya; Tamotsu Matsubara, Chiryu; Yasuo Ishikawa, Kuwana, all of Japan

[73] Assignee: Nippondenso Co., Ltd., Kariya, Japan

[21] Appl. No.: 845,112

[22] Filed: Mar. 27, 1986

[30] Foreign Application Priority Data

Mar. 29, 1985 [JP] Japan .................................. 60-68266

[51] Int. Cl.4 ........................ C08L 23/04; C08L 1/02; C08L 21/00
[52] U.S. Cl. ...................................... 524/13; 524/27; 524/35; 524/68; 524/70; 524/71
[58] Field of Search ........................ 524/68, 70, 71, 13, 524/27, 15, 35

[56] References Cited

U.S. PATENT DOCUMENTS 2,634,256  4/1953  Sparks et al. .......................... 524/13
4,340,513  7/1982  Moteki et al. ......................... 524/13
4,409,345  10/1983 Moteki et al. ......................... 524/13

FOREIGN PATENT DOCUMENTS

49/17835  2/1974  Japan .
52-36134  9/1977  Japan .
56-9576   3/1981  Japan .

Primary Examiner—Maurice J. Welsh
Assistant Examiner—Nathan M. Nutter
Attorney, Agent, or Firm—Cushman, Darby & Cushman

[57] ABSTRACT

A polyolefin-base resin composition comprising a vegetable fibrous material in fiber form containing cellulose as major constituent and a high flow rate polyolefin-base resin having a melt index of 20 to 100. By using this resin it has become possible to improve the poor processability of a conventional polyolefin-base resin composition incorporated with a vegetable fibrous material in fiber form containing cellulose as major constituent. The invention makes it possible to produce an article of large size and small wall thickness by injection molding while desirable mechanical characteristics being retained.

5 Claims, No Drawings

POLYOLEFIN-BASE RESIN COMPOSITION

BACKGROUND OF THE INVENTION

1. Field of the Invention

This invention relates to a polyolefin-base resin composition incorporated with vegetable fibrous materials in fiber form containing fiber-form cellulose as major constituent. Such a resin composition is conveniently used in industrial commodities such as the casing for an air conditioner of cars.

2. Description of the Related Art

There is described in Japanese patent publication Nos. 36,134/77 and 9,576/81 a material of polyolefin resins incorporated with a vegetable fibrous material containing cellulose as major constituent, such as wood flour, rice hulls, or waste paper. Such a material is actually used but to a limited extent. However, because of their poor processability, conventional composite materials comprising polyolefin-base resins incorporated with vegetable fibers containing cellulose as major constituent are unsuitable for general use and few of them are being in use. For instance, if such a molding material is used in molding an article of a large size or of a small thickness by the most popular method of injection molding, it will be found difficult to fill the mold completely with the material. The reason for this was found by the present inventor to be attributable to the problem of mold flow of the material. When the molding temperature is increased to improve the mold flow, there occurs deterioration of the vegetable fiber in the composite material, leading to the emission of malodor or the decrease in physical properties which renders the composite material unable to manifest full advantage of its characteristics. As a consequence, the composite, if remains as such without improvement, will be confined in its use within a narrow range including vacuum forming.

The primary object of this invention is to overcome the above difficulties and to provide a polyolefin-base molding composition excellent in processability and physical properties.

SUMMARY OF THE INVENTION

This invention relates to a polyolefin-base resin composition comprising a polyolefin-base resin and a vegetable fibrous material in fiber form containing cellulose as major constituent, which is characterized by being such that said polyolefin-base resin is a high flow-rate type having a melt index of 20 to 100.

DETAILED DESCRIPTION OF THE INVENTION

According to this invention, the flow rate of the resin composition is improved by using a polyolefin-base resin of high flow rate in the composition incorporated with a vegetable fibrous material containing cellulose as major constituent. The flow rate of the resin composition can be further improved by adding other additives such as lubricants and plasticizers. When melted in the molding operation, the thermoplastic resin composition incorporated with a fibrous material becomes a dispersion of stiff fiber in molten resin, and may be assumed to exhibit the flow characteristics similar to those of a system comprising a liquid and, suspended therein, a stiff fiber. In order to decrease the viscosity of such a system, it is most effective to decrease the viscosity of the liquid dispersing medium. It is, therefore, most effective to use a polyolefin-base resin of a high flow rate in order to improve the flow rate of the polyolefin-base resin composition, i.e. a resin composite.

The term "polyolefin-base resin", as used herein, means a resin which contains a large proportion of polyolefin structure and exhibits primary properties of a polyolefin, regardless of whether it is a single polymer species or a mixture of polymers. The polyolefin-base resins include chemically modified polyolefins (hereinafter referred to as modified polyolefins) themselves, modified polyolefins incorporated with unmodified polyolefin resins (hereinafter referred to simply as polyolefin resins, as distinguished from polyolefin-base resins) such as polypropylene, and modified polyolefins incorporated with thermoplastic rubbers such as polyolefin elastomers.

The term "polyolefin resins" means polymers derived from olefins as major monomers and mixtures of these polymers. Such polymers include homopolymers and copolymers of various olefins or copolymers of olefins with other monomers, regardless of their chemical structure (straight chain, branched chain, or stereospecific structure). The polyolefin resins include polypropylene of mostly isotactic structure, low-density or high-density polyethylene, copolymers with other olefins, and mixtures thereof. Of these polyolefin resins, especially preferred are homo- or co-polymers of propylene and polymer mixtures containing said propylene homopolymer or copolymers as major constituents.

The term "modified polyolefin resins" means polyolefin resins combined with at least one carboxylic acid or anhydride thereof to introduce a polar group into polyolefin resins so that the resulting modified polyolefin resins may bind firmly with the polar group of the vegetable fibrous material containing cellulose as major constituent. Suitable compounds are mono- or poly-carboxylic acids, preferably dicarboxylic acids or anhydrides thereof having an olefinic double bond, such as maleic acid, fumaric acid, and maleic anhydride. Especially preferred are cycloaliphatic dicarboxylic acids having a cis-type double bond in the ring or anhydrides thereof. As examples of such compounds, mention may be made of cis-4-cyclohexene-1,2-dicarboxylic anhydride (generally called tetrahydrophthalic anhydride), cis-4-cyclphexene-1,2-dicarboxylic acid (generally called tetrahydrophthalic acid), endobicyclo(2,2,1)-5-heptene-2,3-dicarboxylic anhydride (generally celled himic acid anhydride), endobicyclo(2,2,1)-5-heptene-2,3-dicarboxylci acid (generally called himic acid), endobicyclo(2,2,1)-1,2,3,4,7,7-hexachloro-2-heptene-5,6-dicarboxylic anhydride (generally called chlorendic anhydride), and endobicyclo(2,2,1)-1,2,3,4,7,7-hexachloro-2-heptene-5,6-dicarboxylic acid (generally called chlorendic acid).

The polyolefin-base resin composition can be improved in flow rate when a polyolefin-base resin of high flow rate is used, no matter whether a polyolefin resin is used alone or a modified polyolefin or a thermoplastic rubber such as polyolefin elastomer is added to improve the mechanical characteristics.

According to this invention, the vegetable fibrous material is incorporated preferably in an amount of 20 to 60% by weight based on the final composition. If the fibrous material is below 20% by weight, the reinforcing effect of cellulose fiber is not manifested with respect to strength, stiffness, and thermal resistance, whereas if the amount of fibrous material exceeds 60% by weight, the composition becomes too brittle to be of practical use. The remaining 40 to 80% by weight of the composition are occupied by the polyolefin-base resin having a high flow rate of 20 to 100 in terms of melt index. If a polyolefin-base resin having a melt index smaller than 20 is incorporated with a vegetable fibrous material containing cellulose as major constituent, the improvement in flow rate of the composition is insufficient, whereas if a polyolefin-base resin having a melt index exceeding 100 is used, the composition becomes brittle. Therefore, the preferable range of meet index is from 20 to 100. The melt index herein referred to is that determined under the test conditions L in Table 1 of ASTM D 1238 or the test conditions 4 in Table 1 of JIS K 7210, both of which are well known to those skilled in the art.

The uniform blending of various constituents of the present composition can be achieved by applying those equipments and techniques which are generally employed in incorporating fillers into resins, such as a high-velocity flow mixer, extruder, or the like or a combination thereof, provided that the dispersion of fiber is satisfactory and the fiber is not injured or carbonized in order that the characteristics of cellulose fiber be fully manifested. Other additives such as stabilizers, flame retarders, and mineral fillers can be added. The flow rate of the composition can be further improved by the addition of lubricants and plasticizers.

The disintegration of vegetable fibrous material into individual fiber can be performed by cutting paper sheets into small pieces of about 3 to 6 mm in size and disintegrating the cut sheets by the high-velocity in a high-velocity flow mixer, or by disintegrating the small pieces of paper in a pulverizing mill such as a turbo mill, or by disintegrating paper sheets in a high-velocity flow mixer or a pulverizer such as grash mixer. It is also possible to carry out simultaneously three procedures of mixing coarsely crushed paper sheets with a polyolefin-base resin, disintegrating the paper by beating, and melting the resin.

The polyolefin-base resin composition of this invention comprises a vegetable fibrous material in fiber form containing cellulose as major constituent and a polyolefin-base resin and characterized by being such that the polyolefin-base resin has a high flow rate of 20 to 100 in terms of melt index and improves the flow rate of molten polyolefin-base resin composition. The improvement in flow rate of a resin generally tends to bring about a decrease in mechanical characteristics of the composition, especially under a high temperature atmosphere. However, according to this invention the incorporation of a vegetable fibrous material containing cellulose as major constituent serves to suppress the decline of characteristics, especially the decline of stiffness at high temperatures.

From the foregoing description, it follows that by using the present polyolefin-base resin composition, it is possible to improve the poor processability of the conventional polyolefin-base resin composition incorporated with a vegetable fibrous material in fiber form containing cellulose as major constituent. As a consequence, it has now become possible to produce by injection molding an article of large size or of small thickness, while the desirable mechanical characteristics being retained, thus resulting in great enlargement of the use field for the composition. Moreover, since the present polyolefin-base resin composition utilizes a vegetable fibrous material after disintegration into individual fibers, it is possible to reutilize waste materials such as waste paper or paper scraps in making a high quality polyolefin-base resin composition, resulting in resource saving and a decrease in cost.

As described above, the present invention provides a low-cost resin composition of relatively high strength suitable for injection molding by utilizing waste paper or paper scraps and the resin composition is very useful for the production of industrial commodities such as a large-size narrow-thickness articles by injection molding.

DESCRIPTION OF THE PREFERRED EMBODIMENTS

For the purpose of illustration, Examples and Comparative Examples are described in the following to compare the present resin compositions with the conventional ones.

In Table 1 are shown melt indices of polyolefin base resins and those of polyolefin-base resin compositions. A casing for the heater used in the air conditioning of cars was selected as a typical example of injection molded articles of large size and small thickness (generally 1.2 mm in wall thickness) and the degree of filling out the mold was inspected.

The injection molding was performed under the following conditions:

Molding machine: JSWN550BII (Japan Steel Works, Ltd.)
Cylinder temperature:
  Front section: 195° C.
  Middle section: 195° C.
  Rear section: 180° C.
Injection pressure:
  Primary pressure: 130 kg/cm$^2$
  Secondary pressure: 40 kg/cm$^2$
Injection speed: 5.8/10
Cooling time: 30 seconds

EXAMPLE 1

Into a high-velocity flow mixer, was charged 30 parts by weight of newspaper sheets cut to small pieces of 3 to 6 mm in size. The mixer was operated at a high rpm to disintegrate the newspaper. To the disintegrated paper, were added 56 parts by weight of a polypropylene block copolymer having a melt index of 20 and 14 parts by weight of a modified polyolefin which had a melt index of 15 and contained 99.8% by weight of olefin units and 0.2% by weight of combined endobicyclo(2,2,1)-5-heptene-2,3-dicarboxylic anhydride units (70 parts by weight of total resin). The mixer was operated at a high rpm to meet the resins by the evolved heat of friction and to impregnate the disintegrated newspaper with the molten resin mixture. As soon as the impregnation had been completed, the rpm of the mixer was reduced and the contents were quickly discharged into a cooling mixer to granulate the resulting polyolefin-base resin composition having a high flow rate.

EXAMPLE 2

Into a high-velocity flow mixer, were charged 48 parts by weight of a polypropylene block copolymer having a melt index of 20, 12 parts by weight of a modified polyolefin which had a melt index of 15 and contained 99.8% by weight of olefin units and 0.2% by weight of a combined endobicyclo(2,2,1)-5-heptene-2,3-dicarboxylic anhydride units, and 40 parts by weight of a vegetable fibrous material in fiber form prepared by the thorough disintegration of newspaper sheets as described in Example 1. The mixer was operated at a high rpm and the contents were treated as described in Example 1 to produce a polyolefin-base resin composition of a high flow rate.

EXAMPLE 3

Into a high-velocity flow mixer, were charged 70 parts by weight of a polypropylene copolymer having a melt index of 23 and 30 parts by weight of a vegetable fibrous material in fiber form prepared by the thorough disintegration of newspaper sheets. The mixer was operated at a high rpm and the contents were treated as described in Example 1 to produce a polyolefin-base resin composition of a high flow rate.

EXAMPLE 4

Into a high-velocity flow mixer, were charged 56 parts by weight of a polypropylene homopolymer having a melt index of 23, 14 parts by weight of a modified polyolefin which had a melt index of 15 and contained 99.8% by weight of olefin units and 0.2% by weight of combined endobicyclo(2,2,1)-5-hepten-2,3-dicarboxylic anhydride units, and 30 parts by weight of a vegetable fibrous material in fiber form prepared by the thorough disintegration of newspaper sheets. The mixer was operated at a high rpm and the mixture was treated as described in Example 1 to produce a polyolefin-base resin composition of a high flow rate.

EXAMPLE 5

Into a high-velocity flow mixer, were charged 56 parts by weight of a polypropylene copolymer having a melt index of 50, 14 parts by weight of a modified polyolefin which had a melt index of 15 and contained 99.8% by weight of olefin units and 0.2% by weight of combined endobicyclo(2,2,1)-5-heptene-2,3-dicarboxylic anhydride units, and 30 parts by weight of a vegetable fibrous material in fiber form prepared by the thorough disintegration of newspaper sheets. The mixer was operated at a high rpm and the mixture was treated as described in Example 1 to produce a polyolefin-base resin composition of a high flow rate.

EXAMPLE 6

Into a high-velocity flow mixer, were charged 56 parts by weight of a polypropylene block copolymer having a melt index of 70, 14 parts by weight of a modified polyolefin which had a melt index of 15 and contained 99.8% by weight of olefin units and 0.2% by weight of combined endobicyclo(2,2,1)-5-heptene-2,3-dicarboxylic anhydride units, and 30 parts by weight of a vegetable fibrous material in fiber form prepared by the thorough disintegration of newspaper sheets. The mixer was operated at a high rpm and the mixture was treated as described in Example 1 to prepare a polyolefin-base resin composition of a high flow rate.

EXAMPLE 7

Into a high-velocity flow mixer, were charged 48 parts by weight of a polypropylene block copolymer having a melt index of 70, 12 parts by weight of a modified polyolefin which has a melt index of 15 and contained 99.8% by weight of olefin units and 0.2% by weight of combined endobicyclo(2,2,1)-5-heptene-2,3-dicarboxylic anhydride units, and 40 parts by weight of a vegetable fibrous material in fiber form prepared by the thorough disintegration of newspaper sheets. The mixer was operated at a high rpm and the mixture was treated as described in Example 1 to produce polyolefin-base resin composition having a high flow rate.

EXAMPLE 8

Into a high-velocity flow mixer, were charged 70 parts by weight of a polypropylene block copolymer having a melt index of 70 and 30 parts by weight of a vegetable fibrous material in fiber form prepared by the thorough disintegration of newspaper sheets. The mixer was operated at a high rpm and the mixture was treated as described in Example 1 to produce a polyolefin-base resin composition of a high flow rate.

COMPARATIVE EXAMPLE 1

Into a high-velocity flow mixer, were charged 70 parts by weight of a polypropylene block copolymer having a melt index of 3 and 30 parts by weight of a vegetable fibrous material in fiber form prepared by the thorough disintegration of newspaper sheets. The mixer was operated at a high rpm and the mixture was treated as described in Example 1 to produce a polyolefin-base resin composition.

COMPARATIVE EXAMPLE 2

Into a high-velocity flow mixer, were charged 60 parts by weight of a polypropylene block copolymer having a melt index of 3 and 40 parts by weight of a vegetable fibrous material in fiber form prepared by the thorough disintegration of newspaper sheets. The mixer was operated at a high rpm and the mixture was treated as described in Example 1 to produce a polyolefin-base resin composition.

COMPARATIVE EXAMPLE 3

Into a high-velocity flow mixer, were charged 70 parts by weight of a polypropylene homopolymer having a melt index of 8 and 30 parts by weight of a vegetable fibrous material in fiber form prepared by the thorough disintegration of newspaper sheets. The mixer was operated at a high rpm and the mixture was treated as described in Example 1 to produce a polyolefin-base resin composition.

COMPARATIVE EXAMPLE 4

Into a high-velocity flow mixer, were charged 60 parts by weight of a polypropylene homopolymer and 40 parts by weight of a vegetable fibrous material in fiber form prepared by the thorough disintegration of newspaper sheets. The mixer was operated at a high rpm and the mixture was treated as described in Example 1 to produce a polyolefinbase resin composition.

The results obtained above were as shown in Table 1

TABLE 1

| Example | Polyolefin-base resin | MI of polyolefin-base resin (g/10 min.) | Amount of vegetable fibrous material (parts) | MI of polyolefin-base resin composition (g/10 min.) | Evaluation of molded casing |
| --- | --- | --- | --- | --- | --- |

TABLE 1-continued

| No. | Polyolefin-base resin | MI of polyolefin-base resin (g/10 min.) | Amount of vegetable fibrous material (parts) | MI of polyolefin-base resin composition (g/10 min.) | Evaluation of molded casing |
|---|---|---|---|---|---|
| 1 | 56 parts of polypropylene block copolymer (MI 20) + 14 parts of modified polyolefin (MI 15) | 20 | 30 | 2.3 | Good |
| 2 | 48 parts of polypropylene block copolymer (MI 20) + 12 parts of modified polyolefin (MI 15) | 20 | 40 | 2.0 | " |
| 3 | 70 parts of polypropylene block copolymer (MI 20) | 20 | 30 | 2.0 | " |
| 4 | 56 parts of polypropylene homopolymer (MI 23) + 14 parts of modified polyolefin (MI 15) | 23 | 30 | 2.3 | " |
| 5 | 56 parts of polypropylene block copolymer (MI 50) + 14 parts of modified polyolefin (MI 15) | 50 | 30 | 3.6 | " |
| 6 | 56 parts of polypropylene block copolymer (MI 70) + 14 parts of modified polyolefin (MI 15) | 70 | 30 | 5.0 | " |
| 7 | 48 parts of polypropylene block copolymer (MI 70) + 12 parts of modifed polyolefin (MI 15) | 70 | 40 | 4.5 | " |
| 8 | 70 parts of polypropylene block copolymer (MI 70) | 70 | 30 | 5.0 | " |
| Comp. Example No. | | | | | |
| 1 | 70 parts of polypropylene block copolymer (MI 3) | 3 | 30 | 0.7 | Incompletely filled out* |
| 2 | 60 parts of polypropylene block copolymer (MI 3) | 3 | 40 | 0.5 | Incompletely filled out* |
| 3 | 70 parts of polypropylene homopolymer (MI 8) | 8 | 30 | 0.8 | Incompletely filled out* |
| 4 | 60 parts of polypropylene homopolymer (MI 8) | 8 | 40 | 0.7 | Incompletely filled out* |

Note:
MI: Melt index
Parts: by weight
*Broken upon release from the mold.

As is apparent from Table 1, in Examples 1 to 8, by using high-flow polyolefin-base resins having melt indices of 20 to 70, it was possible to establish a completely filled out condition in the mold upon injection of the resin compositions, producing satisfactorily molded heater casings. As contrasted, in Comparative Examples 1 to 4, use was made of low-flow polyolefin-base resins having melt indices of 3 to 8 and, as a consequence, it was difficult to establish a completely filled out condition in the mold and, hence, no satisfactorily molded casing was obtained.

Other advantages obtained from the use of high-flow polyolefin-base resins having high melt indices are described below in comparison with conventional polyolefin-base resin compositions.

A polyolefin-base resin composition incorporated with a vegetable fibrous material containing cellulose as major constituent generally shows a markedly decreased flow rate due to the incorporated fibrous material. The flow rate of such a composition is closely associated with the fiber length of the fibrous material; with the increase in fiber length the flow rate decreases, resulting in deteriorated moldability. As described in Japanese patent publication No. 9,576/81, the flow rate of a conventional polyolefin-base resin composition incorporated with a vegetable fibrous material can be improved by thoroughly beating the vegetable fibrous material in the resin with stirring and milling for an extended period of time to effect a reduction in fiber length. Such treatment, however, causes deterioration in mechanical properties of the resin composition owing to the decreased fiber length and the effect of thermal history imparted by the agitation and milling for an extended period of time.

As shown in Table 2, as compared with a conventional resin composition, the present resin composition shows a better flow rate even when a fibrous material of comparatively large fiber length is used. This is because a resin material of high flow rate is used in the composition. Owing to the incorporation of fibrous material having a comparatively large fiber length, the present resin composition exhibits better mechanical characteristics compared with a conventional resin composition.

To demonstrate the above description, Examples and Comparative Examples are shown below. The relationship between the fiber length and the mechanical characteristics was as shown in Table 2.

Example a

In a manner as described in Example 1, a polyolefin-base resin composition of a high flow rate was obtained.

Example b

Into a high-velocity flow mixer, were charged 56 parts by weight of a polypropylene homopolymer having a melt index of 50, 14 parts by weight of a modified polyolefin which had a melt index of 15 and contained 99.8% by weight of olefin units and 0.2% by weight of combined endobicyclo(2,2,1)-5-heptene-2,3-dicarboxylic anhydride units and 30 parts by weight of newspaper sheets cut to pieces of 3 to 6 mm in size. The mixer was operated at a high rpm to melt the resins by the evolved heat of friction and to impregnate the disintegrated newspaper with the molten resin mixture. As soon as the impregnation had been completed, the rpm of the mixer was reduced and the contents were quickly discharged into a cooling mixer to granulate the resulting polyolefin-base resin composition of a high flow rate.

Example c

Into a high-velocity flow mixer, were charged 56 parts by weight of a polypropylene block copolymer having a melt index of 50, 14 parts by weight of a modified polyolefin which had a melt index of 15 and contained 99.8% by weight of olefin units and 0.2% by weight of combined endobicyclo(2,2,1)-5-heptene-2,3-dicarboxylic anhydride units, and 30 parts by weight of newspaper sheets cut to pieces of about 3 to 6 mm in size. The mixture was treated as described in Example b to produce a polyolefin-base resin composition of a high flow rate.

Comparative Example x

Into a high-velocity flow mixer, were charged 56 parts by weight of a polypropylene block copolymer having a melt index of 3, 14 parts by weight of a modified polyolefin which had a melt index of 15 and contained 99.8% by weight of olefin units and 0.2% by weight of combined endobicyclo(2,2,1)-5-heptene-2,3-dicarboxylic anhydride units, and 30 parts by weight of a vegetable fibrous material in fiber form prepared by the thorough disintegration of newspaper sheets. The mixture in the mixer was stirred at a high rpm to melt the resins by the evolved heat of friction and to impregnate the disintegrated sheets with the molten resins. The stirring at high speed was continued until the fiber of paper had been sufficiently reduced in length. The speed of revolution was then decreased and the contents of the mixer were discharged into a cooling mixer to obtain a polyolefin-base resin composition.

The mechanical characteristics were tested by the following methods:

Tensile strength and elongation: ASTM D 638.
Impact strength (notched and unnotched): ASTM D 256.

TABLE 2

Fiber length of disintegrated paper and mechanical characteristics.

| | Fiber length (mm) | Tensile strength (kg/cm$^2$) | Elongation (%) | Impact strength Notched (kg·cm/cm$^2$) | Impact strength Unnotched (kg·cm/cm$^2$) | Flow rate of resin composition (melt index, g/10 min.) |
|---|---|---|---|---|---|---|
| Example No. | | | | | | |
| a | 0.53 | 415 | 11.0 | 3.0 | 19.3 | 2.3 |
| b | 0.68 | 420 | 11.5 | 3.4 | 19.8 | 2.3 |
| c | 0.90 | 403 | 10.0 | 3.0 | 22.7 | 3.6 |
| Comparative Example No. | | | | | | |
| x | 0.30 | 370 | 9.0 | 2.5 | 17.0 | 0.9 |

What is claimed is:

1. A polyolefin-base resin composition comprising:
    a vegetable fibrous material having a fiber length of more than 0.3 mm, said vegetable fibrous material containing cellulose as a major constituent; and
    a polyolefin-base resin having a melt index of 20 to 100, said vegetable fibrous material being 20 to 60% by weight of said composition and said polyolefin-base resin being 40 to 80% by weight of the composition.

2. A polyolefin-base resin composition according to claim 1, wherein the polyolefin-base resin contains a polyolefin chemically modified by the introduction of structural units of at least one compound selected from the group consisting of carboxylic acids and anhydrides thereof.

3. A polyolefin-base resin composition according to claim 1, wherein the melt index is 20 to 70.

4. A polyolefin-base resin composition according to claim 1, wherein said polyolefin-base resin is a polyolefin resin combined with at least one carboxylic acid, said carboxylic acid being selected from the group consisting of maleic acid, fumaric acid, endobicyclo-(2,2,1)-1-heptene-2,3-dicarboxylic acid, cis-4-cyclohexene-1,2-dicarboxylic acid and endobicyclo (2,2,1)-2-1,2,3,4,7,7-hexachloro-2-heptene-5,6-dicarboxylic acid.

5. A polyolefin-base resin composition according to claim 1, wherein said polyolefin-base resin is a polyolefin resin combined with at least one carboxylic acid anhydride, said carboxylic acid anhydride being selected from the group consisting of maleic anhydride, cis-4-cyclohexene-1,2dicarboxylic anhydride, endobicyclo-(2,2,1)-5-heptene-2,3dicarboxylic anhydride and endobicyclo (2,2,1)-1,2,3,4,7,7-hexachloro-2-heptene-5,6-dicarboxylic anhydride.

* * * * *